US008606773B2

(12) United States Patent
Cypher et al.

(10) Patent No.: US 8,606,773 B2
(45) Date of Patent: Dec. 10, 2013

(54) METHOD FOR COMBINING AND PROCESSING WEB DATA USING TABLES AND PROGRAMMING-BY-DEMONSTRATION

(75) Inventors: Allen Cypher, Aptos, CA (US); Tessa A. Lau, Mountain View, CA (US); James Lin, Cupertino, CA (US); Jeffrey W. Nichols, San Jose, CA (US); Jeffrey Wong, Pittsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 12/689,216

(22) Filed: Jan. 18, 2010

(65) Prior Publication Data

US 2011/0179087 A1 Jul. 21, 2011

(51) Int. Cl.
*G06F 17/30* (2006.01)
(52) U.S. Cl.
USPC ............................................ 707/722; 707/723
(58) Field of Classification Search
USPC .................... 707/790, 809, 811, 722, 723
See application file for complete search history.

(56) References Cited

PUBLICATIONS

Fujima et al., "C3W: Clipping, Connecting and Cloning for the Web", 2004, pp. 444-445.*
Huynh, D., R.C. Miller, and D. Karger. Potluck: Data Mash-Up Tool for Casual Users. In *Proc. ISWC 2007*. Springer (2007), 239-252.
IBM, IBM Lotus Mashups. http://www.ibm.com/software/lotus/products/mashups/.
Kandogan, E., E. Haber, R. Barrett, A. Cypher, P. Maglio, and H. Zhao. A1: End-User Programming for Web-based System Administration. In *Proc. UIST 2005*. ACM Press (2005), 211-220.
Little, G., T.A. Lau, A. Cypher, J. Lin, E.M. Haber, and E. Kandogan. Koala: Capture, Share, Automate, Personalize Business Processes on the Web. In *Proc. CHI 2007*. ACM Press (2007), 943-946.
Microformats. http://microformats.org/.
Microsoft, Microsoft Popfly. http://www.popfly.com.
Scaffidi, C., B. Myers, and M. Shaw. Topes: Reusable Abstractions for Validating Data. In *Proc. ICSE 2008*. ACM Press (2008), 1-10.
Solvent. http://simile.mit.edu/wiki/Solvent.
Tuchinda, R., P. Szekely, and C.A. Knoblock. Building Data Integration Queries by Demonstration. In *Proc. IUI 2008*. ACM Press (2008), 170-179.
Viegas, F.B., M. Wattenberg, F. Van Ham, J. Kriss, and M. McKeon, Many Eyes: A Site for Visualization at Internet Scale. *IEEE Transactions on Visualization and Computer Graphics*, 2007. 13(6): 1121-1128.
Wong, J. and J. Hong. Making Mashups with Marmite: Towards End-User Programming for the Web. In *Proc. CHI 2007*. ACM Press (2007), 1435-1444.
Yahoo!, Pipes. http://pipes.yahoo.com/.
Bigham, J.P., A.C. Cavender, R.S. Kaminsky, C.M. Prince, and T.S. Robison. Transcendence: Enabling a Personal View of the Deep Web In *Proc. IUI 2008*. ACM Press (2008), 169-178.

(Continued)

*Primary Examiner* — Hung Q Pham
(74) *Attorney, Agent, or Firm* — Shimokaji & Associates, P.C.

(57) ABSTRACT

A method, system and program product for combining and processing web data using tables and programming-by-demonstration is disclosed. Direct manipulation and programming-by-demonstration techniques are used to automatically populate tables with information collected from various web sites. The invention augments a data set with new values computed by a web site.

19 Claims, 9 Drawing Sheets

(56) References Cited

PUBLICATIONS

Cypher, A., Eager: Programming Repetitive Tasks by Demonstration, in *Watch What I Do: Programming by Demonstration*, A. Cypher, Editor. MIT Press. pp. 205-217, 1993.

Dontcheva, M., S.M. Drucker, D. Salesin, and M.F. Cohen. Relations, Cards, and Search Templates: User-Guided Web Data Integration and Layout. In *Proc. UIST 2007*. ACM Press (2007), 61-70.

Dontcheva, M., S.M. Drucker, G. Wade, D. Salesin, and M.F. Cohen. Summarizing Personal Web Browsing Sessions. In *Proc. UIST 2006*. ACM Press (2006), 115-124.

Ennals, R. and D. Gay. User-Friendly Functional Programming for Web Mashups. In *Proc. ICFP 2007*. ACM Press (2007), 223-234.

Faaborg, A. and H. Lieberman. A Goal-Oriented Web Browser. In *Proc. CHI 2006*. ACM Press (2006), 751-760.

Fujima, J., A. Lunzer, K. Hornbaek, and Y. Tanaka. Clip, Connect, Clone: Combining Application Elements to Build Custom Interfaces for Information Access. In *Proc. UIST 2004*. ACM Press (2004), 175-184.

Hupp, D. and R.C. Miller. Smart Bookmarks: Automatic Retroactive Macro Recording on the Web. In *Proc. UIST 2007*. ACM Press (2007), 81-90.

Huynh, D., S. Mazzocchi, and D. Karger. Piggy Bank: Experience the Semantic Web Inside Your Web Browser. In *Proc. ISWC 2005*. Springer (2005), 413-430.

Huynh, D., R.C. Miller, and D. Karger. Enabling Web Browsers to Augment Web Sites' Filtering and Sorting Functionalities. In *Proc. UIST 2006*. ACM Press (2006), 125-134.

* cited by examiner

FIG. 6

Vege Table — Untitled

| | A | B |
|---|---|---|
| | Col 1 | |
| 1 | 1293 Lennon Way, San Jose, CA, 95125 | $1,499,000 |
| 2 | 919 Michigan Ave, San Jose, CA, 95125 | $1,495,000 |
| 3 | 919 Michigan Ave, San Jose, CA, 95125 | $1,495,000 |
| 4 | 1486 Hicks Ave, San Jose, CA, 95125 | $1,486,000 |

Save | Import Data from Web Page... | Create New Script | Run | Refresh Table

Table 1 | Done

METHOD FOR COMBINING AND PROCESSING WEB DATA USING TABLES AND PROGRAMMING-BY-DEMONSTRATION

BACKGROUND

The present invention relates generally to the field of processing web data, and more specifically, to combining and processing web data using tables and programming-by-demonstration.

Combining web data is a way to integrate data from multiple web sites to fit a particular need. Mashups are applications that combine functionality and data from multiple web sites to help users solve tasks not originally envisioned by web site developers.

Combining and processing web data often requires substantial technical expertise. Constructing mashups typically requires programming skill which limits non-programmers to using mashups that have been created by others.

Hence, there is a need for a more efficient system and method for combining and processing web data using tables and programming-by-demonstration.

SUMMARY

According to one embodiment of the present invention, a data combination method comprises creating initial data in a table by a user; demonstration by the user a method of using the initial data in the table to retrieve first data from a first web site and place the first data into the table; and requesting by the user that the demonstration method be repeated using different data from the table; and repeating the data combination method one or more times.

In another embodiment of the present invention, a computer program product for processing a data combination method comprises a computer readable storage medium having computer readable code embodied therewith, the computer readable program code including: computer readable code that creates initial data in a table by a user; computer readable code that processes demonstration by the user a method of using the initial data in the table to retrieve first data from a first web site and place the first data into the table; computer readable code that processes requests by the user that the demonstration method be repeated using different data from the table; and computer readable code that repeats the data combination method one or more times.

In another embodiment of the present invention, a method comprises regenerating a table of data, the regenerating comprising: reverting the table to an earliest saved initial data; and repeating each of a plurality of previously demonstrated methods in the order the plurality of previously demonstrated methods were performed, wherein each of the plurality of previously demonstrated methods demonstrate using the initial data in the table to retrieve first data from a first web site and place the first data into the table.

These and other features, aspects and advantages of the present invention will become better understood with reference to the following drawings, description and claims.

BRIEF DESCRIPTION OF THE SEVERAL VIEWS OF THE DRAWINGS

FIG. 6 is an exemplary embodiment of the invention showing an example user interface showing data after being extracted and placed in the table;

FIG. 8 is an exemplary embodiment of the invention showing an example user interface during computation of values for rows in the table.

DETAILED DESCRIPTION

Figure 1:
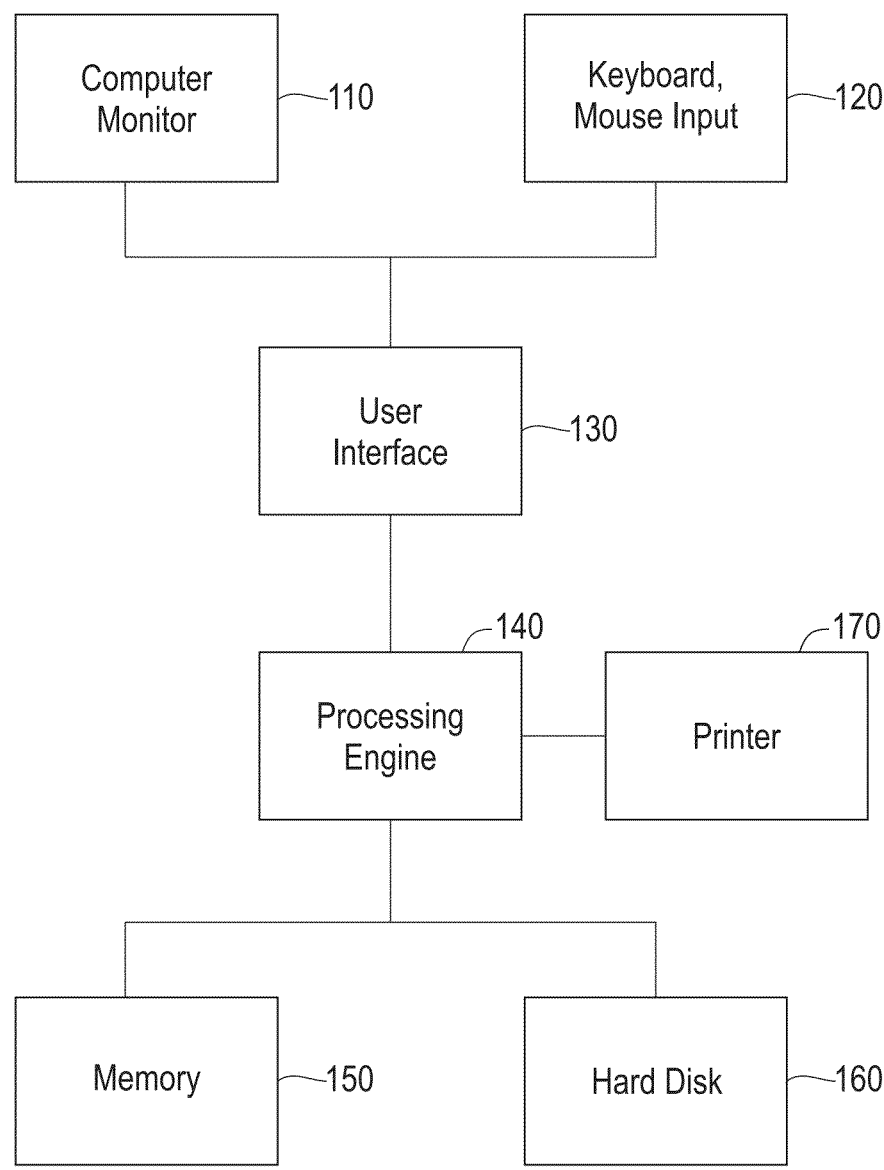
FIG. 1 is a block diagram of a system according to one exemplary embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. The features described in this paper include:

A method, system and program product for combining and processing web data using tables and programming-by-demonstration.

Direct-manipulation and programming-by-demonstration techniques to automatically populate tables with information collected from various web sites. A data set is augmented with new values computed by a web site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer-readable program code embodied thereon.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction performing system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction performing system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA (JAVA is a registered trademark of Sun Microsystems), Smalltalk, C++ or the like and conventional procedural programming languages, such as the "C" programming language or similar programming languages. The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which perform via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which perform on the computer or other programmable apparatus provide processes for implementing the functions/acts specified in the flowchart and/or block diagram block or blocks.

FIG. 1 is a block diagram of a system 100 according to an exemplary embodiment of the invention. The system 100 may include a computer monitor 110, a keyboard and mouse 120, a user interface 130, processing engine 140, memory 150, a hard disk 160, and a printer 170.

A user may utilize the invention by using the user interface 130 displayed on the computer monitor 110 and operating the user interface 130 with the keyboard and mouse 120. The user may utilize the system 100 by inputting data and functions from the user interface 130 for processing by the processing engine 140. The user interface 130 and the processing engine 140 may be stored in computer random access memory 150 and on a hard disk 160. The user may also print operations from the user interface 130 on the printer 170.

Figure 2:
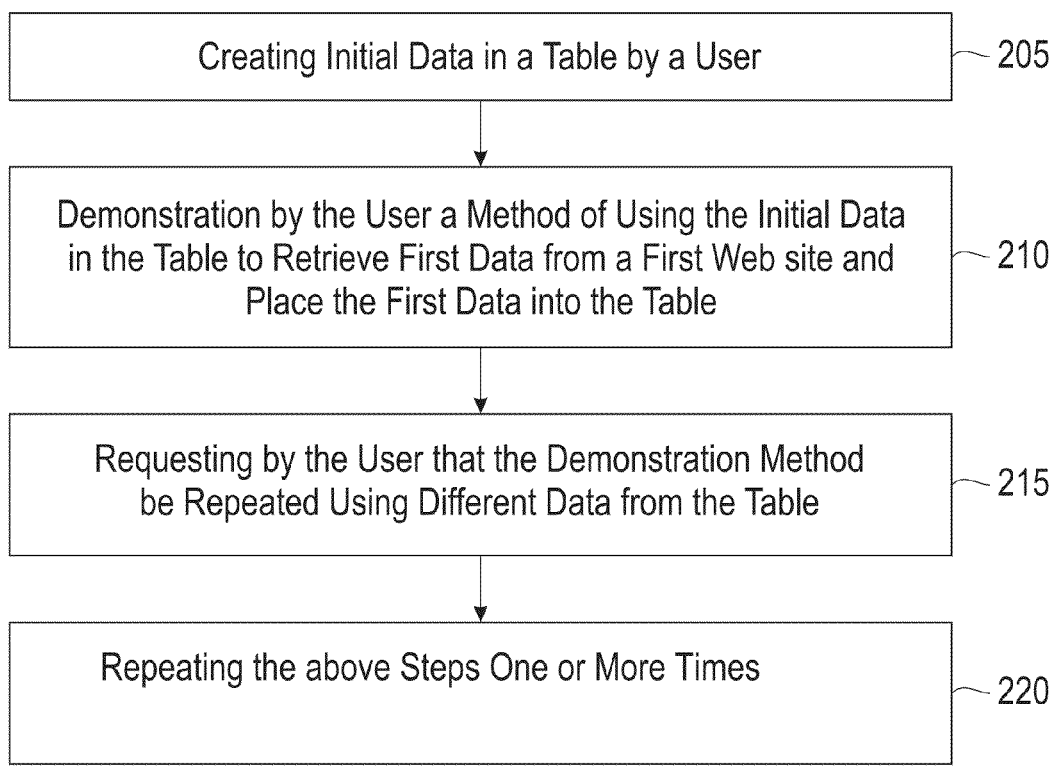
FIG. 2 is a flowchart of an exemplary embodiment of the invention showing creation of mashups through demonstration.
Figure 3:
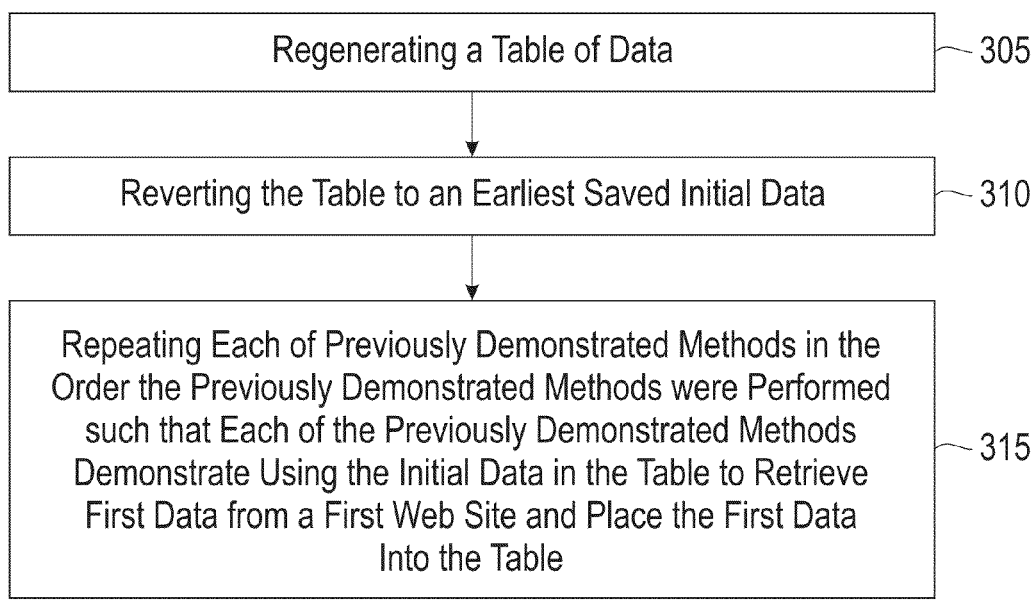
FIG. 3 is a flowchart of an exemplary embodiment of the invention showing a method of regeneration of a table.

Exemplary embodiments may include creating mashups through demonstration as shown at FIG. 2, and regeneration of a table as shown at FIG. 3.

Exemplary processing in the system 100 of FIG. 1 is shown in FIG. 2. FIG. 2 illustrates an exemplary embodiment of the invention 200 showing creation of mashups through demonstration.

As shown in FIG. 2, a data combination method may include a step 205 may include creating initial data in a table by a user. A step 210 may include demonstration by the user a method of using the initial data in the table to retrieve first data from a first web site and place the first data into the table. A step 215 may include requesting by the user that the demonstration method be repeated using different data from the table. A step 220 may include repeating the data combination method one or more times.

In another possible embodiment the initial data may be imported from an existing tabular data source such as, but not limited to, a spreadsheet. In a further embodiment, the initial data may be extracted from a web page using multiple methods including bulk extraction. In a further embodiment, the initial data may be a previous output of the data combination method. In a further embodiment, the demonstration method may be stored with the table. In a further embodiment, the initial data is stored with the table. In a further embodiment, placing the first data into the table adds to the initial data in the table. In a further embodiment placing the first data into the table replaces the initial data in the table. In a further embodiment, the demonstration method may copy first data from the table, paste the first data into a second web site, retrieve second data from the second web site, and place the second data into the table. In a further embodiment, the demonstration method may interact with one or multiple web sites. In a further embodiment, the second data may include one or more values.

Exemplary processing in the system 100 of FIG. 1 may be described with reference to FIG. 3. FIG. 3 is an exemplary embodiment of the invention showing a method 300 of regenerating a table.

As shown in FIG. 3, a step 305 may include regenerating a table of data. A step 310 may include reverting the table to an earliest saved initial data. A step 315 may include repeating each of previously demonstrated methods in the order the previously demonstrated methods were performed such that each of the previously demonstrated methods demonstrate using the initial data in the table to retrieve first data from a first web site and place the first data into the table.

Figure 4:
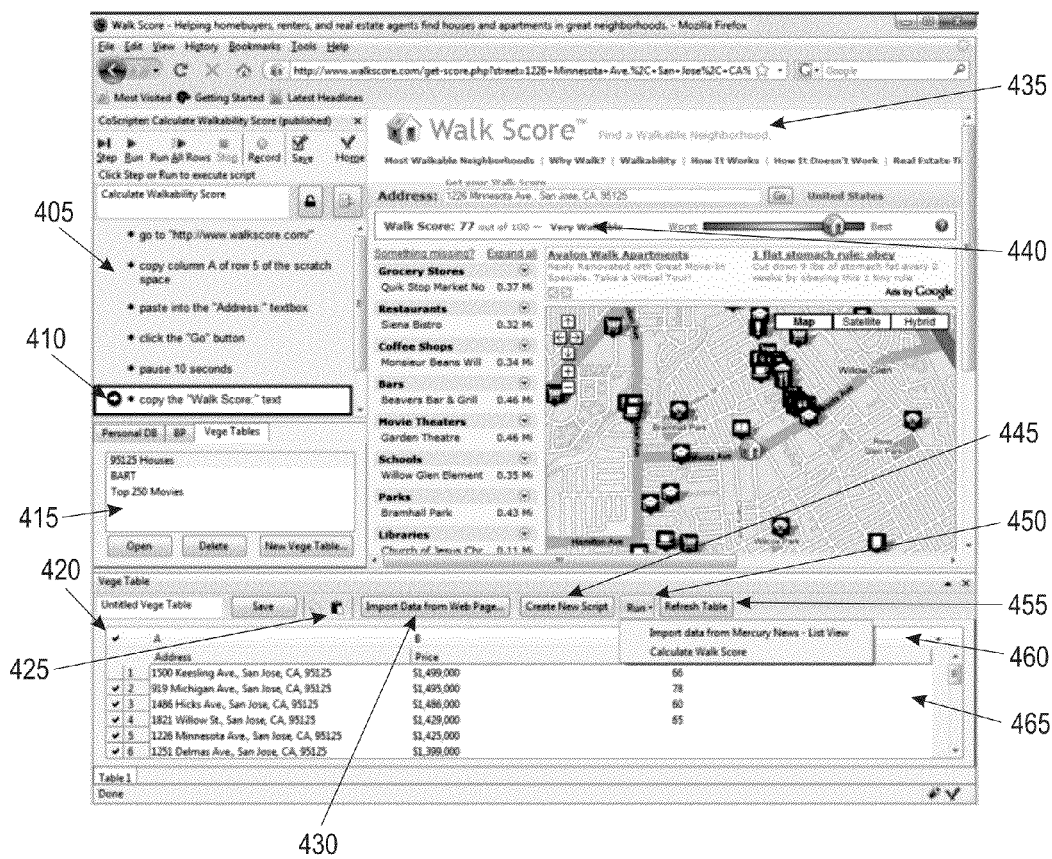
FIG. 4 is an exemplary embodiment of the invention showing an example user interface.

Exemplary user interface processing in the system 100 of FIG. 1 may be understood with reference to FIG. 4. FIG. 4 illustrates an exemplary embodiment of the invention showing an example user interface 400.

As shown in FIG. 4, an example user interface may display a current script 405, a currently executing script step 410, a list of saved tables 415, a SelectAll button 420, Copy/Paste buttons for table data 425, an Import data button 430, a main browser area 435, an item showing a "Walk score" about to be added to a table 440, a Create new script button 445, a Run button with a menu of table scripts 450, a Refresh table button 455, a New column button 460, and a Table editor 465.

Figure 5:
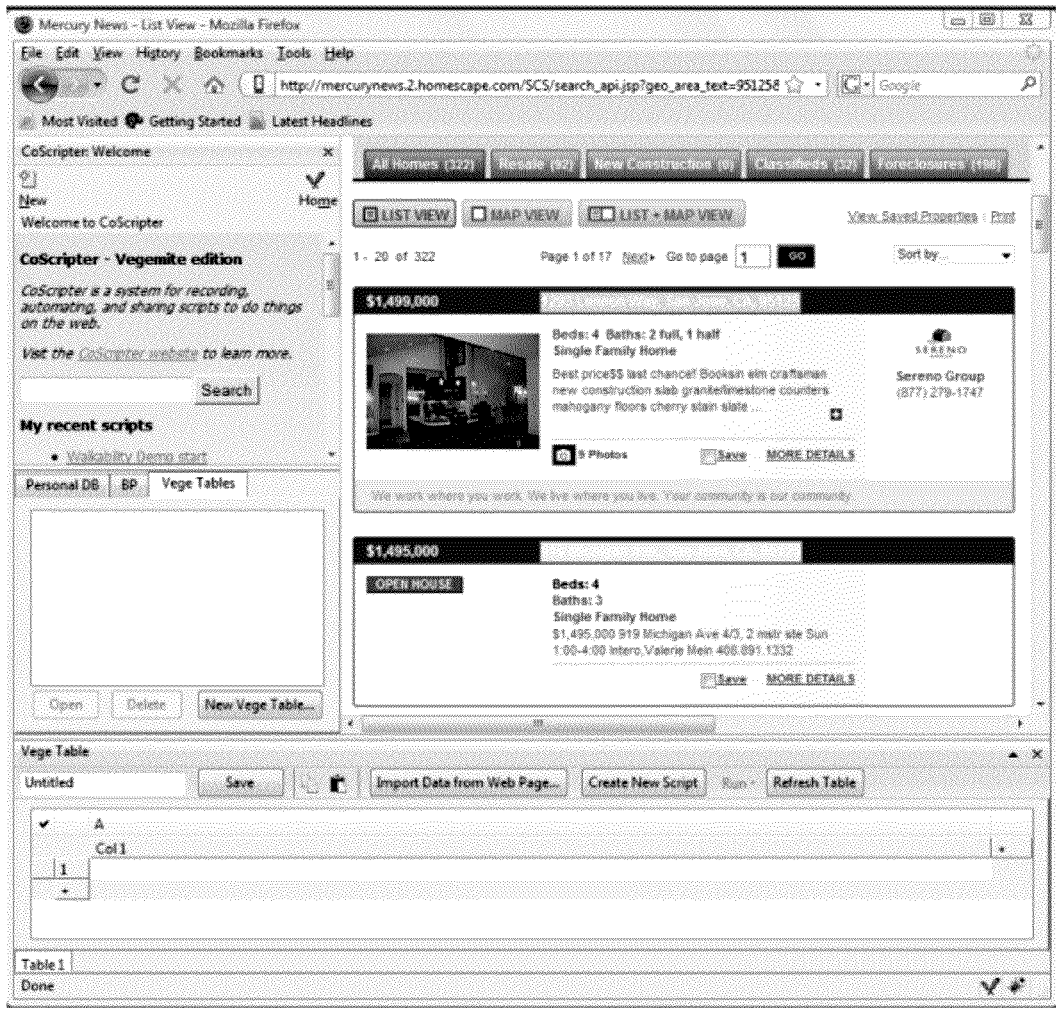
FIG. 5 is an exemplary embodiment of the invention showing an example user interface in bulk extraction mode.

Exemplary user interface processing in the system 100 of FIG. 1 may be understood with reference to FIG. 5. FIG. 5 illustrates an exemplary embodiment of the invention showing an example user interface in bulk extraction mode 500.

As shown in FIG. 5, an example user interface may display extracting initial data for a walkability scenario. FIG. 5 illustrates an embodiment in bulk extraction mode on a news web site.

Exemplary user interface processing in the system 100 of FIG. 1 may be understood with reference to FIG. 6. FIG. 6 illustrates an exemplary embodiment of the invention showing an example user interface showing data after being extracted from a table 600.

As shown in FIG. 6, an example user interface may display data after data has been selected from a web site and placed into a table.

Figure 7:
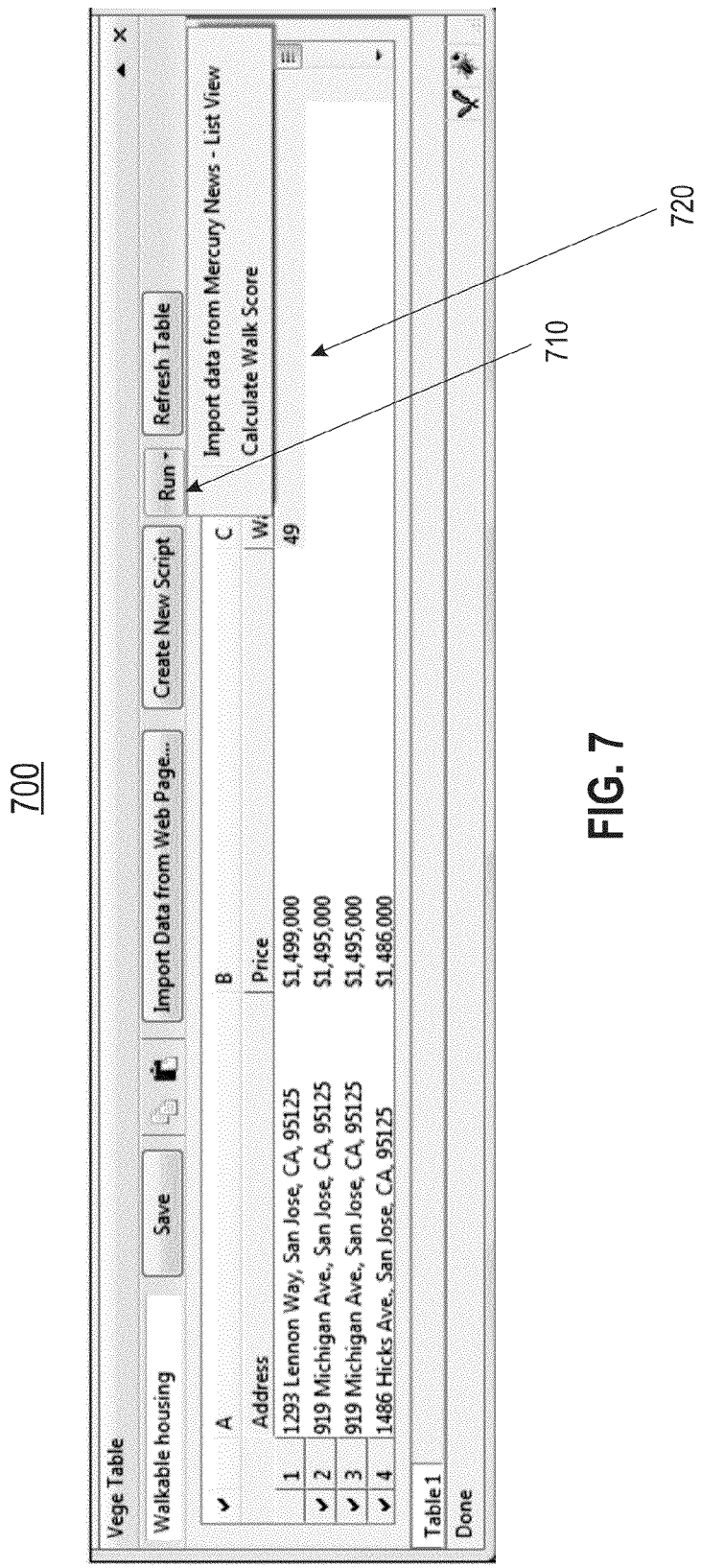
FIG. 7 is an exemplary embodiment of the invention showing an example user interface after a script has been recorded.

Exemplary user interface processing in the system 100 of FIG. 1 may be understood with reference to FIG. 7. FIG. 7 illustrates an exemplary embodiment of the invention showing an example user interface after a script has been recorded 700.

As shown in FIG. 7, an example user interface may display data after a script has been recorded. Selecting a script from the run menu 710 may run the script from each of the selected rows 720.

Figure 8:
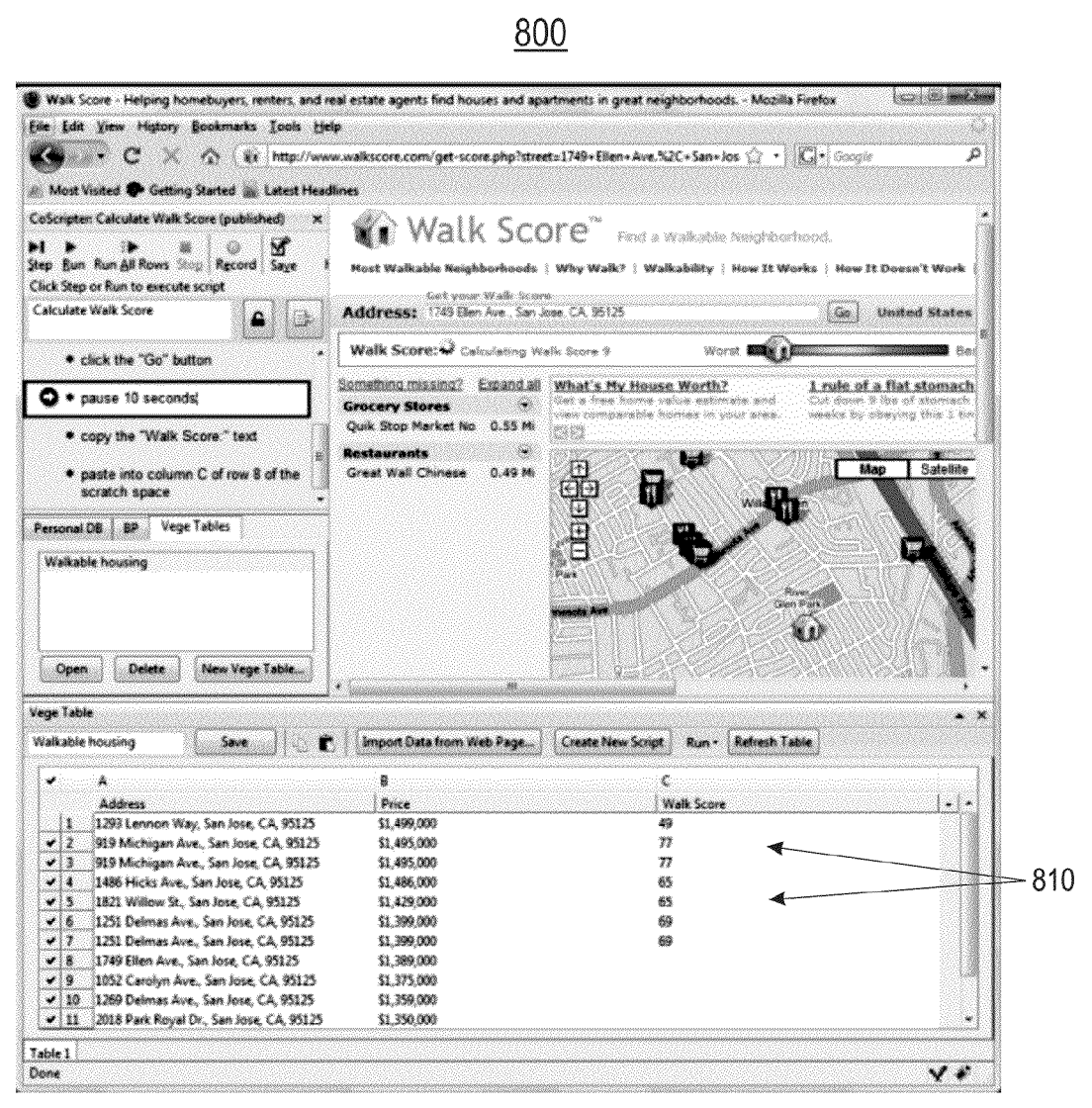

Exemplary user interface processing in the system 100 of FIG. 1 may be understood with reference to FIG. 8. FIG. 8 illustrates an exemplary embodiment of the invention showing an example user interface during computation of values for rows in a table 800.

As shown in FIG. 8, an example user interface may display data during computation of walk scores for rows 810 in a "walkability scenario".

Figure 9:
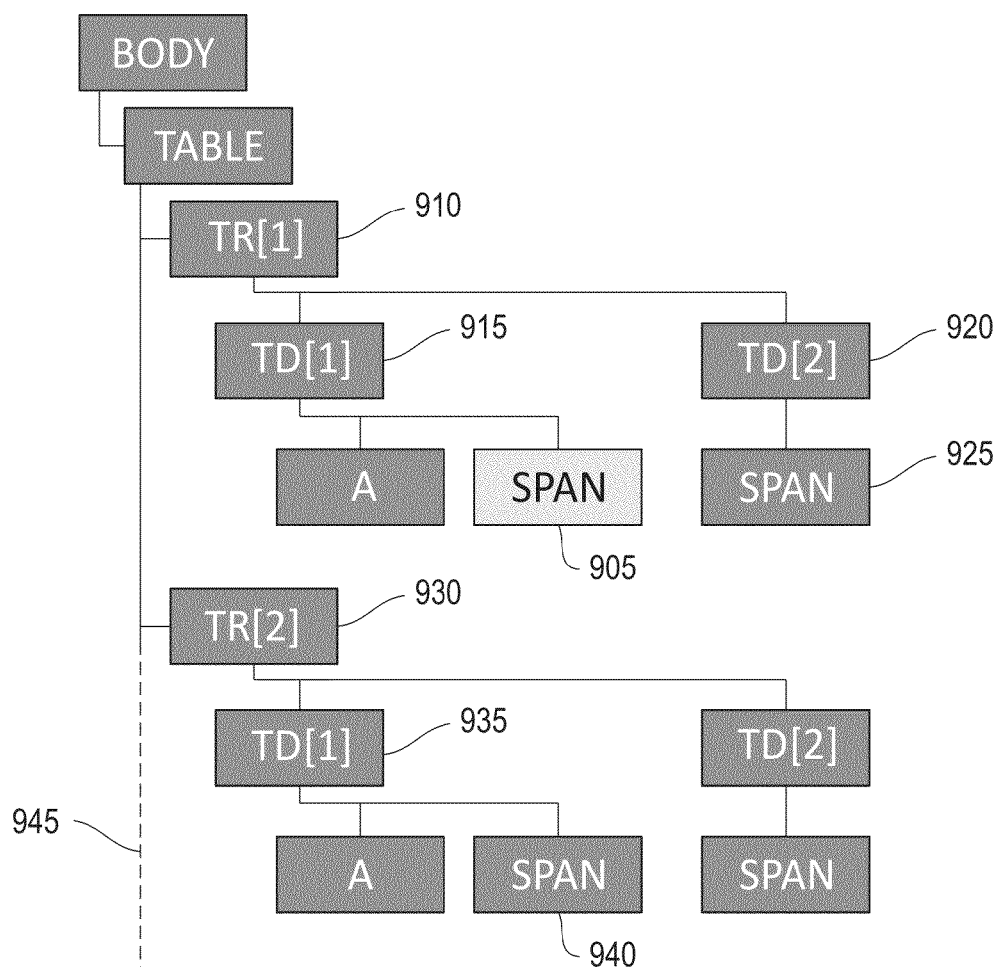
FIG. 9 is an exemplary embodiment of the invention showing an example of a Document Object Model (DOM) tree for a page with repeating content.

Exemplary processing in the system 100 of FIG. 1 may be understood with reference to FIG. 9. FIG. 9 illustrates an exemplary embodiment of the invention showing an example of a Document Object Model (DOM) tree for a page with repeating content 900.

As shown in FIG. 9, the user may select an element 905 in bulk extraction mode. After the user selects the element 905, the system 100 of FIG. 1 may determine other elements that should be extracted. Matches for the parent of the SPAN 905 may be computed. The parent of SPAN 905 may be designated as TR[1] 910/TD[1] 915. A match is found as TR[1] 910/TD[2] 920 contains a SPAN element 925. TR[2] 930 is represented as being on a different row as TR[1] 910. TR[2] 930/TD[1] 935 also matches as they are also parents of a SPAN element 940. The dotted line 945 indicates additional rows that may also contain a SPAN element. In this example, SPAN elements and the parents of SPAN elements are extracted as a bulk extraction.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more performable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. Example embodiments may be performed with or without query processing.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be understood, of course, that the foregoing relates to exemplary embodiments of the invention and that modifications may be made without departing from the spirit and scope of the invention as set forth in the following claims.

What is claimed is:

1. A method comprising:
   placing initial data in a first table by the execution of a computer processor, wherein the initial data is data from a website, a spreadsheet, or a combination of the website and the spreadsheet;
   recording a user's actions on a computer as a first script, wherein the first script is a first demonstration method that includes using the initial data in the first table, to retrieve first data from a first web site, and placing the retrieved first data into the first table;
   retrieving second data from a second website using the first script and different data from the first table and placing the retrieved second data into the first table;
   receiving a selection from a menu of a second script different from the first script, wherein the second script is a second demonstration method that is a second recording of the user's actions;
   receiving a selection of rows in the first table;
   running the second script to compute a walk score for each of the selected rows;
   displaying, on a user interface, the selected rows and corresponding computed walk scores.

2. The method of claim 1, wherein the initial data is imported from an existing tabular data source.

3. The method of claim 1, wherein the initial data is extracted from a web page using multiple methods including bulk extraction.

4. The method of claim 1, wherein the initial data is a previous output of the data combination method.

5. The method of claim 1, wherein the initial data is stored with the first table.

6. The method of claim 1, wherein placing the first data into the table adds to the initial data in the first table.

7. The method of claim 1, wherein placing the first data into the first table replaces the initial data in the table.

8. The method of claim 1, wherein the first demonstration method copies first data from the first table, pastes the first data into a second web site, retrieves the second data from the second web site, and places the second data into the first table.

9. The method of claim 8, wherein the first demonstration method interacts with one or multiple web sites.

10. The method of claim 8, wherein the second data include one or more values.

11. The method of claim 1, wherein the first demonstration method retrieves data from the first web site, the second web site, and a third web site, and place the data retrieved from the first web site, the second web site, and the third web site into the first table and a second table.

12. A computer program product for processing a data combination method, the computer program product comprising a computer readable storage medium having computer readable code embodied therewith, the computer readable program code being configured to:
 place initial data in a table by the execution of a computer processor;
 record a user's actions on a computer as a first script, wherein the first script is a first demonstration method that includes using the initial data in the table, to retrieve first data from a first web site, and placing the retrieved first data into the table;
 retrieve second data from a second web site using the first script and different data from the first table and placing the retrieved second data into the first table;
 receive a selection from a menu of a second script as a second demonstration method different from the first script, wherein the second script is a recording of the user's actions on the computer;
 receive a selection of rows in the table;
 run the second script to compute a walk score for each of the selected rows; and
 display, on a user interface, the selected rows and corresponding computed walk scores.

13. The computer program product of claim 12, wherein the initial data is imported from an existing tabular data source.

14. The computer program product of claim 12, wherein the initial data is extracted from a web page using multiple methods including bulk extraction.

15. The computer program product of claim 12, wherein the initial data is the previous output of the data combination method.

16. The computer program product of claim 12, wherein the initial data is stored with the table.

17. The computer program product of claim 12, wherein placing the first data into the table adds to the initial data in the table.

18. The computer program product of claim 12, wherein placing the first data into the table replaces the initial data in the table.

19. The computer program product of claim 12, wherein the second data include one or more values.

* * * * *